United States Patent [19]

Takahashi

[11] Patent Number: 4,539,858

[45] Date of Patent: * Sep. 10, 1985

[54] SHIFT CONTROL MECHANISM OF AN AUTOMOTIVE MANUAL TRANSMISSION

[75] Inventor: Kotei Takahashi, Yokohama, Japan

[73] Assignee: Nissan Motor Company, Ltd., Japan

[ * ] Notice: The portion of the term of this patent subsequent to Jun. 4, 2002 has been disclaimed.

[21] Appl. No.: 350,391

[22] Filed: Feb. 19, 1982

[30] Foreign Application Priority Data

Feb. 20, 1981 [JP] Japan ................................. 56-22884

[51] Int. Cl.³ ............................................ B60K 20/00
[52] U.S. Cl. .................................................... 74/475
[58] Field of Search ...................... 74/475, 477, 473 R

[56] References Cited

U.S. PATENT DOCUMENTS

| | | | |
|---|---|---|---|
| 3,216,274 | 11/1965 | Hurst | 74/476 |
| 3,495,131 | 2/1970 | Melcher | 339/17 CF |
| 3,962,930 | 6/1976 | Frazee | 74/473 R |
| 4,193,316 | 3/1980 | Kelbel | 74/477 |
| 4,277,983 | 7/1981 | Izumi et al. | 74/477 |

FOREIGN PATENT DOCUMENTS

| | | | |
|---|---|---|---|
| 202464 | 3/1959 | Fed. Rep. of Germany . | |
| 55-5100466 | 7/1980 | Japan | 74/473 R |
| 1183796 | 3/1970 | United Kingdom | 74/473 R |
| 1274334 | 5/1972 | United Kingdom . | |
| 2071237 | 9/1981 | United Kingdom | 74/473 R |

OTHER PUBLICATIONS

Japanese Utility Model Specification for public inspection, 48-19691, (1973).

Primary Examiner—Lawrence J. Staab
Attorney, Agent, or Firm—Lowe, King, Price & Becker

[57] ABSTRACT

In an automotive manual transmission comprising a common fork shaft on and along which a plurality of shift forks are slidable, a control rod rotatable about and slidable along the axis thereof which is normal to the axis of the common fork shaft, a pivotting pin extending normal to both the axes of the common fork shaft and the control rod, a plurality of pivotting levers pivotally mounted on the pivotting pin and jointly engaged at their one ends with the corresponding shift forks, a selecting head member secured to the control rod and engageable with the other end of selected one of the pivotting levers when the control rod is rotated about the axis thereof into an angular position, an interlock plate rotatably mounted on the control rod to ensure that only the selected pivotting lever is rotatable at any given time, and a supporting member removably connected to the transmission housing and mounting thereon the pivotting pin, there is proposed a positioning arrangement in which the supporting member is provided with at least one positioning means which is, when the supporting member is mounted to the transmission housing, brought into a locking engagement with a partner positioning means provided at the transmission housing.

8 Claims, 9 Drawing Figures

SHIFT CONTROL MECHANISM OF AN AUTOMOTIVE MANUAL TRANSMISSION

BACKGROUND OF THE INVENTION

1. Field of the Invention

The present invention relates in general to a control mechanism of an automotive manual transmission, and more particularly to a shift control mechanism of a manual transmission which is particularly adaptable for use in a front-wheel-drive automotive vehicle having a transverse mounted engine.

2. Description of the Prior Art

In the transmission of the type mentioned above, the shift control mechanism is so arranged that the control rod actuated by a manual shift lever in the vehicle cabin extends perpendicular to the fork shaft on which the shift forks slide axially. Thus, a so-called direction changing device is equipped between the control rod and the shift forks, which functions to convert the axial movement of the control rod to sliding movement of a selected one of the shift forks along the axis of the fork shaft. In assembling such transmission, positioning of the control rod relative to the direction changing device has been made by the aid of a separate positioning member, such as a pattern plate, previously connected to the transmission housing. However, as is known, the provision of such separate positioning member causes not only narrowing of the parts-mounting space in the transmission housing, but also complication of the assembling procedure of the transmission. Furthermore, the positioning of the positioning member per se to the transmission housing is difficult, so that it sometimes becomes necessary to readjust the position of the positioning member and thus the control rod after mounting them to the transmission housing.

SUMMARY OF THE INVENTION

It is therefore an object of the present invention to provide an improved shift control mechanism of a manual transmission adapted for use with a transverse mounted engine, which is free of the above-mentioned drawbacks.

According to the present invention, there is provided, in a shift control mechanism of an automotive manual transmission comprising a fork shaft on and along which shift forks are slidable for shifting the corresponding coupling sleeves, a control rod which is rotatable about and slidable along the axis thereof which is normal to the axis of the fork shaft, a pivoting pin extending normal to both the axes of the fork shaft and the control rod, at least one pivoting lever pivotally mounted on the pivoting pin and jointly engaged at its one end with the associated shift fork to induce, when rotated about the pivoting pin, a sliding movement of the associated shift fork along the fork shaft, a selecting head member secured to the control rod to be movable therewith, the head member being engageable with the other end of the pivoting lever when the control rod is rotated about the axis thereof into an angular position, an interlock plate rotatably mounted on the control rod to ensure that only the selected pivoting lever is rotatable at any given time, a temporarily restraining means for temporarily restraining the control rod in one of its longitudinal positions, the means including longitudinally spaced notches formed on the control rod and an engaging member biased to be slidably engaged with the notches, the engaging member being received in a hole formed in the transmission housing, and a supporting member removably secured to the transmission housing and mounting thereon the pivoting pin, a positioning arrangement for positioning the parts of the transmission relative to the transmission housing, the arrangement comprising a first projection formed on the supporting member, the projection being tightly received in the hole of the transmission housing; a second projection formed on one of the supporting member and the transmission housing; and another hole formed in the other of the supporting member and the transmission housing, the second projection being tightly received in the another hole, whereby when the first and second projections are both tightly received in the corresponding holes, the displacement of the supporting member relative to the transmission housing in a direction normal to the axes of the first and second projections is prevented.

BRIEF DESCRIPTION OF THE DRAWINGS

Other objects and advantages of the present invention will become apparent from the following description when taken in conjunction with accompanying drawings, in which.

DETAILED DESCRIPTION OF THE INVENTION

Figure 1:
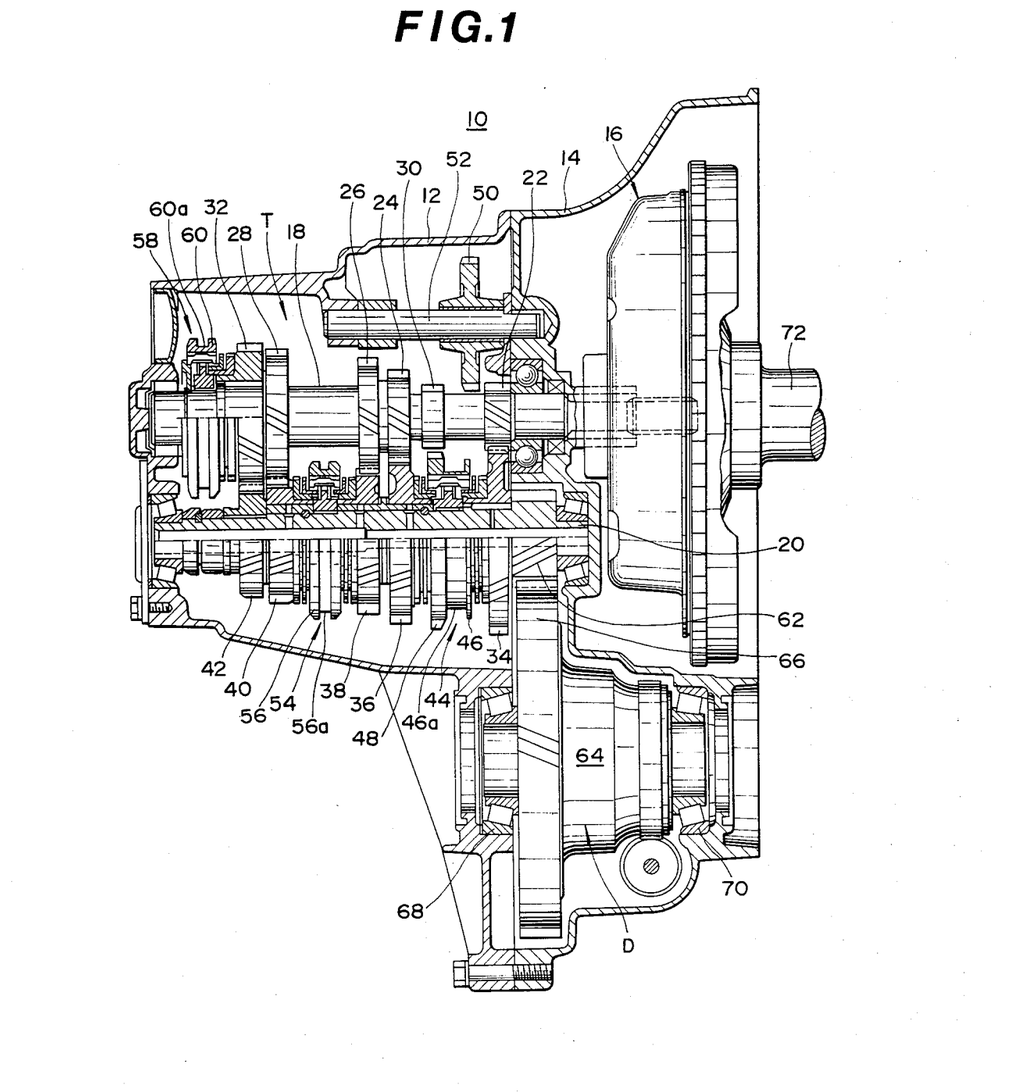
FIG. 1 is a longitudinal section view of a manual transmission equipped with a shift control mechanism according to the present invention, some parts being shown displaced for clarification of the drawing.
Figure 2:
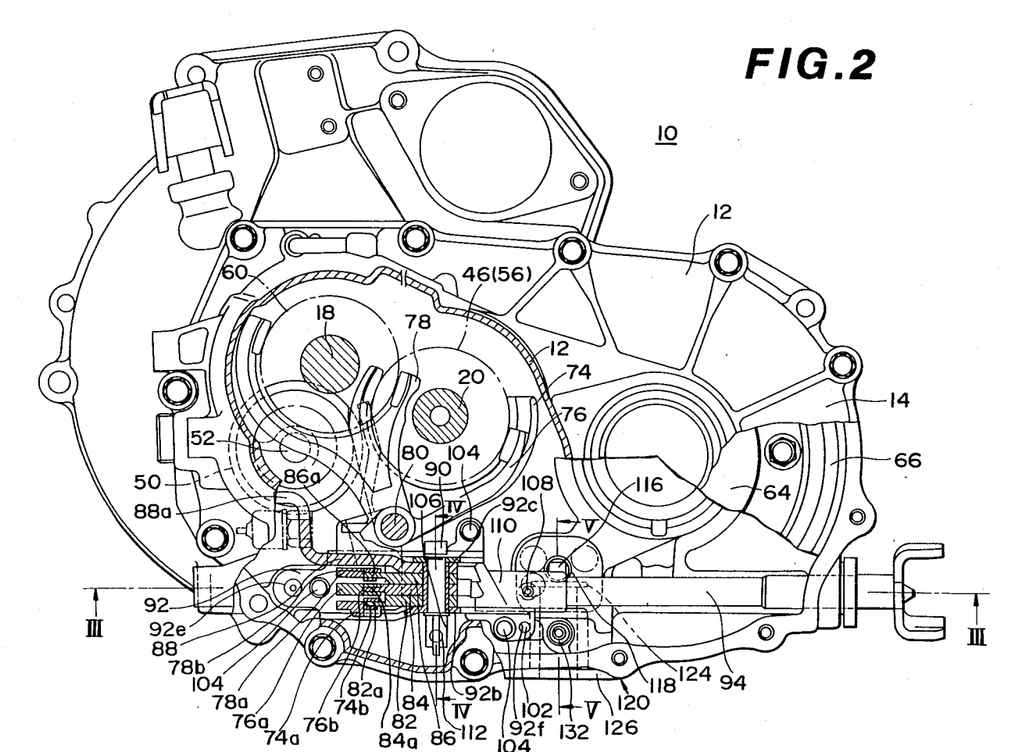
FIG. 2 is a transverse section view of the transmission, showing an essential portion of the shift control mechanism of the present invention.
Figure 3:
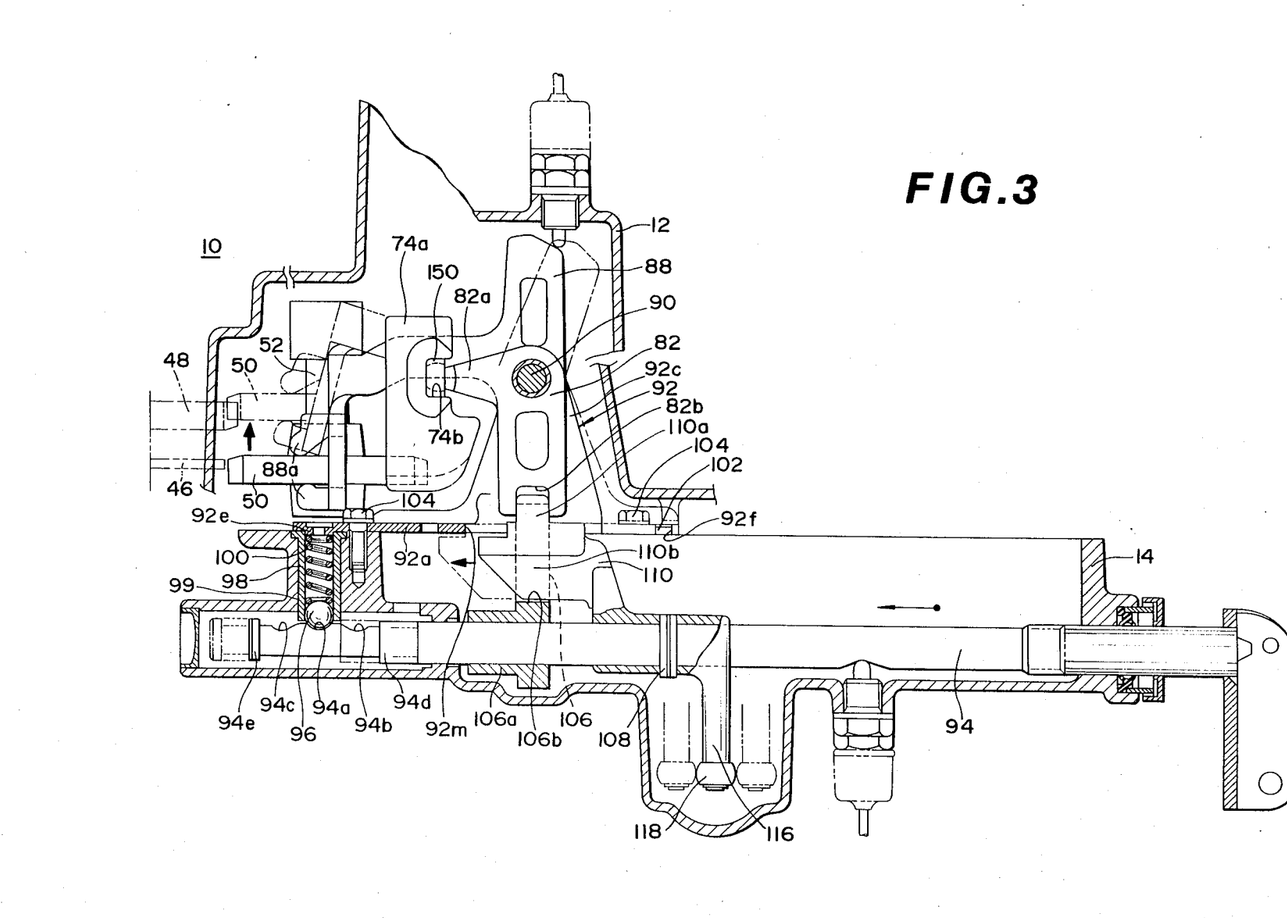
FIG. 3 is a sectional view taken along the line III—III of FIG. 2.

Referring to FIGS. 1 to 3, particularly FIG. 2, there is shown generally a transaxle assembly 10 adapted for use in a front-wheel-drive motor vehicle having a transverse mounted engine, in which assembly a shift control mechanism according to the present invention is incorporated. The transaxle assembly 10 is a single unit including a transmission T and a differential gear D as is seen from FIG. 1.

The transaxle assembly 10 comprises housings 12 and 14 which are united to mount therein gear trains of the transmission T as well as gears of the differential D. The housing 14 also acts as a housing for a clutch 16.

Within the housing 12, there are parallelly arranged an input shaft 18 and an output shaft 20 which are rotatable about the respective axes thereof relative to the housing. The input shaft 18 is adapted to receive torque from the engine through the clutch 16. Defined by or secured to the input shaft 18 are a first speed input gear 22, a second speed input gear 24, a third speed input gear 26, a fourth speed input gear 28 and a reverse input gear 30. A fifth speed input gear 32 is journalled on the input shaft 18. Journalled on the output shaft 20 are a first speed output gear 34, a second speed output gear 36, a third speed output gear 38 and a fourth speed output gear 40 which are constantly meshed with the first, second, third and fourth speed input gears 22, 24, 26 and 28, respectively. A fifth speed constantly output gear 42 is splined to the output shaft 20 and constantly meshed with the fifth speed input gear 32.

A first-second synchronizing clutch mechanism 44 is slidably supported on the output shaft 20, which functions to smoothly connect either the first speed output gear 34 or the second speed output gear 36 to the output shaft 20 thereby to establish the first or second forward gear ratio. A coupling sleeve 46 of the mechanism 44 is formed at its periphery with a reverse gear 48 which is meshingly engageable with the reverse input gear 39 through a reverse idler gear 50 (which is shown displaced in FIG. 1 for clarification of the drawing). The reverse idler gear 50 is rotatably and axially slidably mounted on a stationary shaft 52 which is parallel to the input and output shafts 18 and 20.

A similar third-fourth synchronizing clutch mechanism 54 is slidably supported on the output shaft 20, which functions to smoothly connect either the third speed output gear 38 or the fourth speed output gear 40 to the output shaft 20 thereby to establish the third or fourth forward gear ratio. Designated by numeral 56 is a coupling sleeve of the mechanism 54 which is shiftable rightward and leftward in FIG. 1.

A fifth synchronizing clutch mechanism 58 is slidably supported on the input shaft 18 for smoothly connecting the fifth speed input gear 32 to the input shaft 18 thereby to establish the fifth forward gear ratio. In particular, when a coupling sleeve 60 of this mechanism 58 is shifted rightward in FIG. 1, the fifth speed input gear 32 meshing with the fifth speed output gear 42 becomes into driving connection with the input shaft 18.

A drive pinion 62 is defined by or secured to the output shaft 20. The drive pinion 62 constantly meshes with a ring gear 66 secured to a casing 64 of the differential gear D thereby to constitute a final drive mechanism. The differential gear casing 64 is rotatably supported at its axial both ends by the housings 12 and 14 through thrust bearings 68 and 70 which are mounted in the housings 12 and 14, respectively. Although not shown in the drawing (FIG. 1), a pair of road wheel driving shafts are inserted at their inside ends into the casing 64 from the axial ends of the casing and respectively engaged with side gears (not shown) of the diferential gear D.

In the above-described construction, the engine output which is transmitted from an engine crank shaft 72 to the input shaft 18 through the clutch 16 rotates the first, second, third and fourth speed output gears 34, 36, 38 and 40 through the first, second, third and fourth speed input gears 22, 24, 26 and 28. However, as far as the coupling sleeves 46, 56 and 60 and the reverse idler gear 50 take the respective rest positions as shown in FIG. 1, the engine power is not transmitted to the output shaft 20 thereby keeping the transmission T in a neutral condition.

When the coupling sleeve 46 is shifted rightward in FIG. 1, the first speed output gear 34 meshing with the first speed input gear 22 becomes into driving connection with the output shaft 20, so that the engine power is transmitted to the driving wheels (not shown) through the first speed input gear 22, the first speed output gear 34, the drive pinion 62, the ring gear 66 and the differential gear D thereby to establish a first forward gear ratio. Similar to this, when the coupling sleeve 46 is shifted leftward, a second forward gear ratio is established.

When the coupling sleeve 56 is shifted rightward in FIG. 1, the third speed output gear 38 meshing with the third speed input gear 26 becomes into driving connection with the output shaft 20 thereby to establish a third forward gear ratio, while, when the coupling sleeve 56 is shifted leftward, the fourth speed output gear 40 meshing with the fourth speed input gear 28 becomes into driving connection with the output shaft 20 thereby to establish a fourth forward gear ratio.

When the coupling sleeve 60 is shifted rightward in FIG. 1, the fifth speed input gear 32 meshing with the fifth speed output gear 42 becomes into driving connection with the input shaft 18 to be rotatable therewith, so that the engine power is transmitted to the driving wheels through the fifth speed input gear 32, the fifth speed output gear 42 splined to the output shaft 20, the drive pinion 62, the ring gear 66 and the differential gear D thereby to establish a fifth forward gear ratio.

When the reverse idler gear 50 is shifted leftward in FIG. 1 to engage with both the reverse input gear 30 and the reverse output gear 48, the engine power is transmitted to the driving wheels through the reverse input gear 30, the reverse idler gear 50, the reverse output gear 48, the drive pinion 62, the ring gear 66 and the differential gear D thereby to establish a reverse condition.

The shift control mechanism of the present invention, which conducts the above-mentioned operation, has a construction which will be described hereinnext.

As is best seen from FIG. 2, a common fork shaft 80 is arranged in the housing in a manner to be parallel with the input and output shafts 18 and 20. Three shift forks 74, 76 and 78 constructed of aluminum are slidably mounted at their hub sections on the common fork shaft 80 in this order. The shift forks 74, 76 and 78 are operatively engaged with the annular grooves 46a, 56a and 60a (see FIG. 1) of the coupling sleeves 46, 56 and 60, respectively, for shifting these coupling sleeves rightward or leftward in FIG. 1. Each of the shift forks 74, 76 and 78 is formed with an extension 74a, 76a or 78a. The extensions 76a and 78a extend along the fork shaft 80 in the same direction. As will be understood from FIG. 2, the extension 76a is placed between the extension 74a and the extension 78a which is placed at the highest position among the three. For the reason which will become clear hereinafter, the extensions 74a, 76a and 78a are respectively formed at their leading ends with recesses 74b, 76b and 78b which face toward the same direction, that is, toward a motion transmitting mechanism. As will be described hereinnext, the motion transmitting mechanism functions to transmit the motion of a manually operated control rod 94 to one of the shift forks 74, 76 and 78 thereby shifting the corresponding coupling sleeve 46, 56 or 60 in such a manner as is mentioned hereinabove.

The motion transmitting mechanism comprises first, second, third and fourth pivotting levers 82, 84, 86 and 88 which have substantial equal thickness and are pivotally mounted on a common pivoting pin 90 in this order so as to be pivotal about the axis of the pin 90. In the present embodiment, the first, second and third pivotting levers 82, 84 and 86 are identical in shape. As will become clear as the description proceeds, the pin 90 is arranged normal to the axis of the common fork shaft 80. The first, second and third pivotting levers 82, 84 and 86 are respectively formed with first arm portions 82a, 84a and 86a which are respectively and jointly received in the afore-mentioned recesses 74b, 76b and 78b of the shift fork extensions 74a, 76a and 78a to form therewith respective articulated connections. The leading ends of the arm portions 82a, 84a and 86a are equipped with caps 150 (see FIG. 3) of sintered alloy or suitable plastics for effecting abrasion protection. As is seen from FIG. 3, the fourth pivotting lever 88 has an elongate extension 88a which is bifurcated straddling the reverse idler gear 50.

Figure 6:
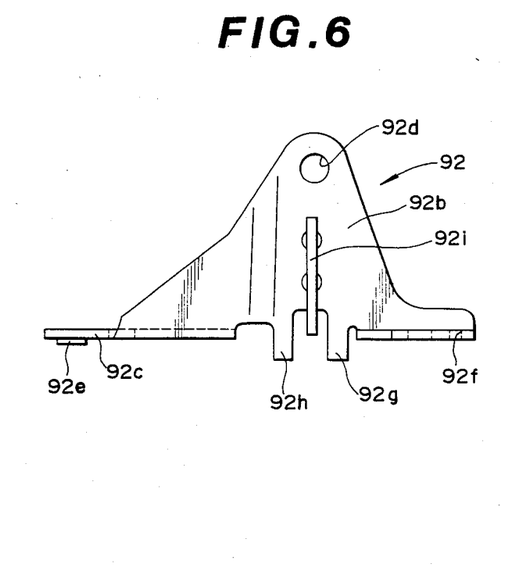
FIG. 6 is a side view of a bracket for mounting pivoting levers therein.
Figure 7:
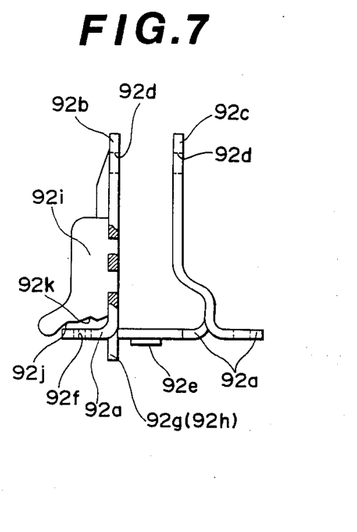
FIG. 7 is a partially broken front view of the bracket.

The unit consisting of the first, second, third and fourth pivotting levers 82, 84, 86 and 88 and the common pin 90 is housed in a supporting member or generally U-shaped bracket 92 which is secured to the housing 14. As is understood from FIGS. 6 and 7 and FIG. 2, the common pin 90 passes through aligned holes 92d respectively formed in spaced side walls 92b and 92c of the bracket 92. The bottom wall 92a of the bracket 92 is formed at spaced sections thereof with three holes (no numerals) through which later-mentioned three bolts 104 are respectively passed. Further, the bottom wall 92a of the bracket 92 is formed at its outer surface with a circular projection 92e, and a positioning hole 92f. As will be understood from FIGS. 2 and 5, the bracket 92 is secured to the housing 14 by the three bolts 104 passing through the three holes of the bracket bottom wall 92a and is arranged so that the first, second, third and fourth pivoting levers 82, 84, 86 and 88 are pivotable about the common pin 90 along respective planes parallel to the axis of the common fork shaft 80. As is seen from FIGS. 2 and 3, securing the bracket 92 to the housing 14 is so made that the circular projection 92e of the bottom wall 92a is put in one open end of a later-mentioned sleeve 98 and the positioning hole 92f of the bottom wall 92a puts therein a positioning pin 102 secured to the housing 14.

As is seen from FIGS. 2 and 3, a control rod 94 is arranged in the housing 14 in such an arrangement that the axis thereof is normal to the axis of the common fork shaft 80. The control rod 94 is rotatable about and slidable along the axis thereof. One end of the control rod 94 is projected outwardly from the housing 14 and connected through a suitable linkage to a conventional manual shift lever (not shown) located in a vehicle cabin. It is to be noted that the selecting operation of the manual shift lever induces rotation of the control rod 94 about the axis thereof and the shifting operation of the manual shift lever induces sliding movement of the control rod 94 along the axis thereof. As is seen from FIG. 3, the control rod 94 is formed at its inwardly leading end portion with three spaced notches 94a, 94b and 94c. A detent ball 96 is slidably received in the afore-mentioned sleeve 98 which is tightly received in a bore 99 formed in the housing 14. A spring 100 is put in the sleeve 98 to bias the detent ball 96 toward the control rod 94. With the detent ball 96 engaged in one of the notches 94a, 94b and 94c, the control rod 94 is restrained in one of its longitudinal positions.

As is understood from FIG. 3, the pivoting levers 82, 84, 86 and 88 are of a bell crank type, and they have at the leading ends of second arm portions thereof respective recesses 82b, 84b, 86b and 88b, the recesses being aligned when all the pivoting levers 82, 84, 86 and 88 are in their neutral or rest positions.

An interlock is provided to ensure that only one pivoting lever 82, 84, 86 and 88 is moved at any given time. A generally sectorial interlock plate 106 is rotatably disposed at its hub section 106a on the control rod 94 with its arcuate free end section slidably received in the aligned recesses 82b, 84b, 86b and 88b of the pivoting levers. As will be understood from FIGS. 4, 5, 6 and 7, the sectorial section of the interlock plate 106 is put between two lug portions 92g and 92h (see FIG. 6) of the bracket 92 so as to restrain the axial movement of the interlock plate 106 along the control rod 94. As is seen from FIG. 8, the interlock plate 106 is formed with a stepped recess 106b which leads to the arcuate free end section. The width of the mouth portion of the recess 106b is equal to or less than the thickness of each pivoting lever. As is seen from FIGS. 8 and 9, a blind hole 106c is formed in the interlock plate 106 extending toward the hub section 106a.

Figure 4:
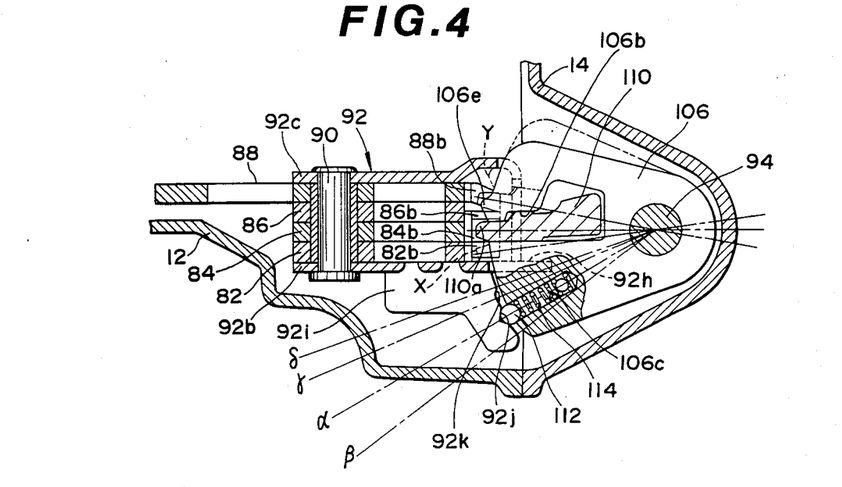
FIG. 4 is a sectional view taken along the line IV—IV of FIG. 2.

As is best seen from FIG. 3, a control head member 110 is secured at its hub section to the control rod 94 by means of a connecting pin 108 to be movable therewith. The control head member 110 has shank portion 110b which extends along the control rod 94 leaving a space therefrom. The shank portion 110b is slidably received in the afore-mentioned stepped recess 106b of the interlock plate 106. Thus, it will be appreciated that the rotation of the control head member 110 with the control rod 94 about the axis of the rod 94 induces a simultaneous rotation of the interlock plate 106, but, the axial movement of the control head member 110 with the control rod 94 does not induce the axial movement of the interlock plate 106. The shank portion 110b of the control head member 110 is formed with a head proper 110a which projects radially outwardly but slightly from the stepped recess 106b of the interlock plate 106 to be received in one of the afore-mentioned recesses 82b, 84b, 86b and 88b of the pivoting levers 82, 84, 86 and 88. As is seen from FIG. 9, a detent ball 112 is slidably received in the blind 106c of the interlock plate 106. A spring 114 is put in the hole 106c to bias the ball 112 toward a notched plate 92i secured to the bracket 92 in a manner as is depicted by FIG. 4. The arrangement of the notched plate 92i relative to the bracket 92 is clearly shown in FIGS. 6 and 7. As is seen from FIGS. 4 and 7, the notched plate 92i is formed with a notch 92j and a step 92k with which the detent ball 112 is engageable. With the detent ball 112 engaged in the notch, the interlock plate 106 is restrained in a predetermined angular position. With this arrangement, a so-called select detent mechanism is provided, which gives the driver a detent feeling when he or she carries out the selecting operation.

Figure 8:
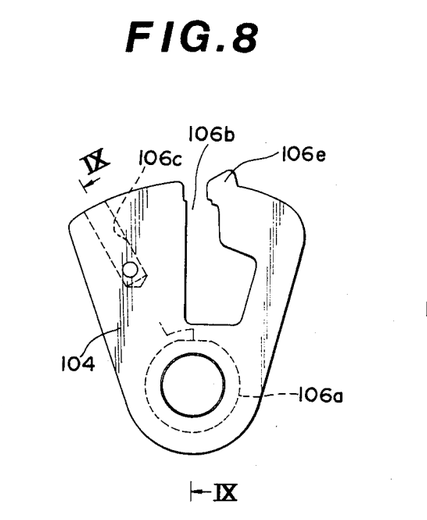
FIG. 8 is a front view of an interlocking plate.
Figure 9:
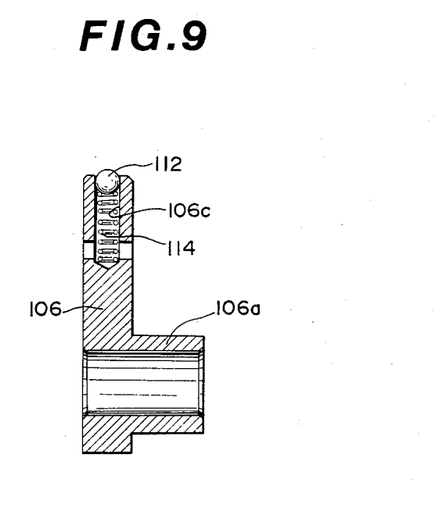
FIG. 9 is an enlarged sectional view taken along the line IX—IX of FIG. 8.

As is best seen in FIG. 8, the interlock plate 106 is formed, at the arcuate free end section near the mouth of the recess 106b, with a projection 106e which serves to limit rotation of the interlock plate 106 about the control rod 94 as will become clear hereinafter.

As is seen from FIG. 3, the control head member 110 is formed, at a side opposite to the shank portion 110b, with an arm 116 of which leading end is equipped with a roller 118 which are parts of a next-mentioned select return mechanism which functions to impose the shift lever operator (driver) a slightly greater effort to move the shift lever when he or she selects the fifth forward speed position or the reverse position. As is seen from FIG. 5, the roller 118 is associated with a biasing unit 120. The unit 120 comprises a holder 122 secured to the housing 14. A piston 124 is slidably received in the holder 122 and a spring 126 is set in the holder 122 to bias the piston 124 to abut against the roller 118. Designated by numeral 128 is a stopper pin which is secured to the holder 122 and projected into an axially extending recess 124c of the piston 124 for limiting the movement of the piston 124. The piston 124 is formed at its cylindrical outer side with an axially extending groove 124c which opens to a hole 122a formed in the holder 122. A detent ball 130 is slidably received in the hole 122a in a manner to be projected into the recess 124a. The ball 130 is biased toward the recess 124a by means of a spring 134 and another ball 136 which are received in a hole 14a defined by the housing 14, the hole 14a being plugged with a bolt 132.

In the following, operation of the shift control mechanism of the present invention will be described.

In order to facilitate the description of the operation, it will be commenced with respect to a condition wherein the control rod 94 is in a neutral position, in both selecting (rotating) and shifting (sliding) movements, as is shown by FIGS. 2 to 5. In this condition, the detent ball 112 (see FIG. 4) carried by the interlock plate 106 is engaged with the notch 92j of the plate 92i to restrain the control rod 94 in a settled position in rotating movement of the rod 94, and the arm 116 (see FIG. 5) of the select return mechanism takes a position indicated by solid line wherein the roller 118 engages the piston 124 which takes its uppermost position. Further, in this condition, the head proper 110a of the control head member 110 is engaged with the recess 84b of the second pivoting lever 84, and as is seen from FIG. 3, the detent ball 96 is engaged with the center notch 94a of the control rod 94 to restrain the control rod 94 in a settled position in sliding movement of the rod 94. Furthermore, in this condition, the coupling sleeves 46, 56 and 60 and the reverse idler gear 50 take the respective positions as shown in FIG. 1, so that the engine power is not transmitted to the differential gear D thereby holding the vehicle in a halt.

Figure 5:
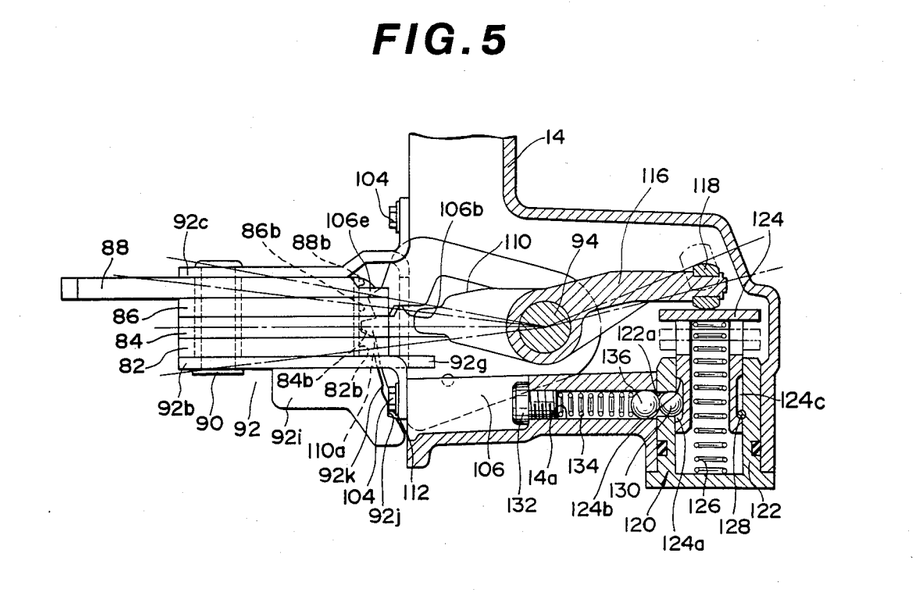
FIG. 5 is a sectional view taken along the line V—V of FIG. 2.

When now the control rod 94 is rotated about its axis in a counterclockwise direction in FIGS. 4 and 5, the control head member 110 rotated together with the rod 94 brings a counterclockwise rotation of the interlock plate 106 moving detent ball 112 from a position on the line α (see FIG. 4) to a position on the line β. During this operation, a detent feeling is given because the detent ball 112 is pushed against the biasing force of the spring 114, and when the head proper 110a of the control head member 110 comes to a position indicated by broken line X in FIG. 4 and contacts a portion of the bracket 92, the operator (driver) can recognize that the control rod 94 has come to a temporary position for the first or second forward gear ratio, in which position the head proper 110a is received in the recess 82b of the first pivoting lever 82. When then the control rod 94 is axially moved in the rightward direction in FIGS. 2 and 3, the first pivoting lever 82 is rotated about the pin 90 in a counterclockwise direction in FIG. 3 thereby shifting through the shift fork 74 the coupling sleeve 46 in the rightward direction in FIG. 1. Thus, as has been mentioned hereinafter, the first forward gear ratio is established. While, when the control rod 94 in the temporary position is axially moved in the leftward direction in FIGS. 2 and 3, the lever 82 is rotated in a clockwise direction in FIG. 3 thereby shifting the coupling sleeve 46 in the leftward direction in FIG. 1. Thus, the second forward gear ratio is established. Although not shown in the drawings, a conventional return spring is mounted to the control rod 94 for ease with which the shifting operation of the control rod 94 for the first or second forward gear ratio is achieved.

During the above-mentioned operation, the detent ball 96 (see FIG. 3) is forced to move from the center notch 94a to the notch 94c or the notch 94b compressing the spring 100. Thus, a detent feeling is given at the sliding movement of the rod 94.

When the control rod 94 in the above-mentioned neutral position is axially moved in the rightward direction in FIGS. 2 and 3, the second pivoting lever 84 is rotated about the pin 90 in a counterclockwise direction in FIG. 3 thereby shifting, through the shift fork 76, the coupling sleeve 56 in the rightward direction in FIG. 1. Thus, the third forward gear ratio is established as has been described hereinabove. When the control rod 94 in the neutral position is axially moved in the leftward direction in FIGS. 2 and 3, the second pivoting lever 84 is rotated in a clockwise direction in FIG. 3 thereby shifting the coupling sleeve 56 in the leftward direction in FIG. 1. Thus, the fourth forward gear ratio is established.

During this shifting operation, the detent feeling is also given by the spring-biased detent ball 96 similar to the case of the above-mentioned operation to the first or second forward gear ratio.

When the control rod 94 in the neutral position is rotated about the axis thereof in a clockwise direction in FIGS. 4 and 5, the control head member 110 rotated together with the rod 94 brings about a clockwise rotation of the interlock plate 106 moving the detent ball 112 from the position on the α (see FIG. 4) to a position on the line γ. At this time, a detent feeling is given because the detent ball 122 is pushed against the biasing force of the spring 114 and is brought into contact with the step 92k of the notched plate 92i. During this operation, the arm 116 (see FIG. 5) extending from the control head member 110 is rotated about the axis of the control rod 94 in a clockwise direction in FIG. 5 pushing via the roller 118 the piston 124 against the force of the spring 126 into a position wherein one end 124b of the recess 124a of the piston 124 contacts the detent ball 130. This operation also gives a detent feeling. When the detent feeling is given, the operator (driver) can recognize that the head proper 110a of the control head member 110 has come to a temporary position to be received in the recess 86b of the third pivoting lever 86. When, then, the control rod 94 is axially moved in the rightward direction in FIGS. 2 and 3, the third pivoting lever 86 is rotated about the pin 90 in a counterclockwise direction in FIG. 3 thereby moving, through the shift fork 78, the coupling sleeve 60 in the rightward direction in FIG. 1. Thus, the fifth forward gear ratio is established.

During this shifting operation, a detent feeling is given by a fact that the detent ball 96 is forced to move from the notch 94a to the notch 94c against the biasing force of the spring 100.

When the control rod 94 in the neutral position is rotated by a great degree about the axis thereof in a clockwise direction in FIGS. 4 and 5 exceeding the temporary position for the fifth forward gear ratio, the detent ball 112 carried by the interlock plate 106 is moved from the position on the line α to a position on the line δ riding over the step 92k. During this operation, the arm 116 (see FIG. 5) of the control head member 110 is greatly rotated about the axis of the control rod 94 in a clockwise direction in FIG. 5 pushing via the roller 118 the piston 124 against the force of the spring 126 by a degree to cause the detent ball 130 to ride over the end 124b of the groove 124a. With the detent ball 130 riding over the groove 124a, a detent feeling is given so that the operator (driver) can recognize that the control rod 94 has passed the temporary position for the fifth forward gear ratio. When the control rod 94 is still further rotated in the same direction, the projection 106e of the interlock plate 106 comes to a position indicated by a phantom line Y in FIG. 4 and contacts a portion of the bracket 92 so that the operator (driver) can recognize that the control rod 94 has come to a temporary position for the reverse gear ratio. In this condition, the head proper 110a of the control head member 110 is received in the recess 88b of the fourth pivoting lever 88. Thus, when then the control rod 94 is axially moved in the leftward direction in FIGS. 2 and 3, the fourth pivoting lever 88 is rotated about the pin 90 in a clockwise direction in FIG. 3, thereby moving the reverse idler gear 50 from the position indicated by solid line to the position indicated by phantom line. That is, the reverse idler gear 50 is shifted leftward in FIG. 1 to engage with both the reverse input gear 30 and the reverse output gear 48 to establish the reverse condition.

During this shifting operation, a detent feeling is given by a fact that the detent ball 96 (see FIG. 3) is forced to move from the notch 94a to the notch 94b against the biasing force of the spring 100.

As is understood from the above, the shifting operation to the fifth forward gear ratio and the reverse gear ratio is made with the arm 116 of the control head member 110 pushing the spring-biased piston 124 of the select return mechanism. However, this shifting operation is smoothly made because of provision of the roller 118 which runs on the piston 124 during such shifting. The shifting or returning operation to the neutral position from the positions for the fifth forward gear ratio and the reverse gear ratio is easily made with a reduced operating force because of assistance of the force produced by the compressed spring 126. In short, a so-called select returning function is achieved.

Even when the operator (driver) intends to carry out the shifting operation with the control rod 94 taking an angular position other than the above-mentioned predetermined temporary positions, the shifting is suppressed because in such a condition the stepped recess 106b of the interlock plate 106 fails to align with any of the recesses 82b, 84b, 86b and 88b of the first, second, third and fourth pivoting levers 82, 84, 86 and 88 thereby blocking the movement of these levers 82, 84, 86 and 88 about the pin 90.

The axial moving distance of the control rod 94 is adjusted by, as is seen from FIG. 3, abutting a shoulder portion 94d of the rod 94 against the downwardly projected portion of the sleeve 98, abutting the control head member 110 against an edge 92m of the bracket bottom wall 92a, and abutting a flanged end 94e of the rod 94 against the projected portion of the sleeve 98. With this, a so-called shift stopper is provided.

Although in the foregoing description, the selecting operation is established by the rotation of the control rod 94 about the axis thereof and the shifting operation is established by the axial movement of the same, it is also possible that the shifting operation is made by the rotation of the rod 94 and the selecting operation is made by the axial movement of the rod. However, in the latter case, the bracket 92 should be so arranged that the longitudinal axis thereof is normal to the axis of the control rod 94.

As is described hereinabove, the shift control mechanism of the present invention has a unique construction in which the pivoting lever mounting device (the bracket 92) per se acts as a base positioning member by which not only the relative positioning between the control rod 94 and the pivoting levers 82, 84, 86 and 88 but also that between the shift forks 74, 76 and 78 and the pivoting levers is precisely achieved. In fact, when the bracket 92 is bolted to the housing 14 with the circular projection 92e and the positioning hole 92f thereof respectively engaged with the open end of the sleeve 98 and the positioning pin 102 of the housing 14, the positioning of the remaining parts, such as the control rod 94, the selecting head member 110 on the rod 94, the pivoting levers 82, 84, 86 and 88, and the interlock plate 106, relative to the bracket 92, that is, relative to one another is automatically established. In short, according to the present invention, the longitudinal positioning of the control rod 94, the angular positioning of the same and the longitudinal positioning of the interlock plate 106 are all established in association with the bracket 92 which is the base positioning member. Thus, the known separate positioning member, such as the pattern plate mentioned above in the prior art description, is no longer required thereby improving the productivity of the transaxle.

What is claimed is:

1. In a shift control mechanism of an automotive manual transmission including shift forks slidable along a fork shaft for shifting corresponding coupling sleeves, a control rod rotatable about and slidable along the axis thereof which is normal to the axis of said fork shaft, a pivoting pin extending normal to both the axes of said fork shaft and said control rod, at least one pivoting lever pivotally mounted on said pivoting pin and jointly engaged at one end thereof with an associated shift fork to induce, upon rotation about the pivoting pin, a sliding movement of the associated shift fork along the fork shaft, a selecting head member secured to said control rod to be movable therewith, said head member being engageable with the other end of said pivoting lever when said control rod rotates about the axis thereof into a certain angular position, an interlock plate mounted on said control rod for rotation therewith to ensure that only the selected pivoting lever is rotatable at any given time, means for temporarily restraining said control rod in one longitudinal position thereof, said means including longitudinally spaced notches formed on said control rod and an engaging member biased to slidably engage with said notches, said engaging member being received in a hole formed in the transmission housing, and a supporting member removably secured to said transmission housing and having mounted thereon said pivoting pin, a positioning arrangement for positioning parts of said transmission relative to the transmission housing, said arrangement comprising:

a first projection formed on said supporting member, said projection being tightly received in a hole of said transmission housing;

a second projection formed on one of said supporting member and said transmission housing; and said second projection being tightly received in another hole formed in the other of said supporting member and said transmission housing, whereby when said first and second projections are both tightly received in the corresponding holes, displacement of said supporting member relative to said transmission housing in a direction normal to the axes of said first and second projections is prevented.

2. A positioning arrangement as claimed in claim 1, wherein said second projection is a pin member secured to said transmission housing, said another hole being formed in said supporting member.

3. A positioning arrangement as claimed in claim 1, further comprising third and fourth projections formed on said supporting member, said third and fourth projections being arranged to partially locate therebetween said interlock plate to restrain axial movement of said interlock plate along the control rod.

4. A positioning arrangement as claimed in claim 1, wherein coupling of said first projection with the corresponding hole is made with an interposal of a sleeve within which said engaging member is held.

5. In a shift control mechanism of an automotive manual transmission including shift forks slidable along a fork shaft for shifting associated coupling sleeves, a pivoting pin extending normal to the axis of said fork shaft, a supporting member removably connected to the transmission housing and supporting thereon said pivoting in, a plurality of pivoting levers mounted on the pivoting pin to be pivotable about the axis of the pin, each of said shift forks jointly engaging with an arm portion of the associated lever so that pivotal movement of said associated pivoting lever about the axis of said pivoting pin induces sliding movement of the associated shift fork on and along the fork shaft, and a control rod arrangement with respect to the axes of said fork shaft and said pivoting pin such that one of rotation and sliding movement of said control rod along the axis thereof induces engagement of the control rod with a selected one of said pivoting levers and pivoting movement of the selected pivoting lever, a positioning arrangement for positioning the parts of said transmission relative to the transmission housing, comprising:

a first projection formed on said supporting member, said projection being tightly received in a hole formed in said transmission housing;

a second projection formed on one of said supporting member and said transmission housing, said second projection being tightly received in another hole formed in the other of said supporting member and said transmission housing, whereby when said first and second projections are both tightly received in the corresponding holes, displacement of said supporting member relative to the transmission housing in a direction normal to the axes of said first and second projections is prevented.

6. A positioning arrangement as claimed in claim 5, wherein said second projection is a pin member secured to said transmission housing, said another hole being formed in said supporting member.

7. A positioning arrangement as claimed in claim 5, wherein the connection between said first projection and the hole of the transmission is made with an interposal of a sleeve.

8. A positioning arrangement as claimed in claim 5, further comprising a plurality of bolts securing said supporting member and said transmission housing to each other.

* * * * *